United States Patent
Borowiec et al.

(10) Patent No.: US 10,652,331 B1
(45) Date of Patent: *May 12, 2020

(54) LOCALLY PROVIDING HIGHLY AVAILABLE CLOUD-BASED STORAGE SYSTEM SERVICES

(71) Applicant: PURE STORAGE, INC., Mountain View, CA (US)

(72) Inventors: Benjamin P. Borowiec, San Jose, CA (US); Terence W. Noonan, Vadnais Heights, MN (US)

(73) Assignee: Pure Storage, Inc., Mountain View, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/967,189

(22) Filed: Apr. 30, 2018

Related U.S. Application Data (63) Continuation of application No. 15/419,551, filed on Jan. 30, 2017, now Pat. No. 10,027,757, which is a
(Continued)

(51) Int. Cl.
| | |
|---|---|
| *G06F 3/06* | (2006.01) |
| *G06F 11/10* | (2006.01) |
| *G06F 13/42* | (2006.01) |
| *G06F 13/40* | (2006.01) |
| *H04L 29/08* | (2006.01) |
| *H04L 12/40* | (2006.01) |

(52) U.S. Cl.
CPC ...... *H04L 67/1097* (2013.01); *H04L 67/1002* (2013.01); *H04L 67/28* (2013.01)

(58) Field of Classification Search
USPC .......... 709/223, 201, 237, 224, 203
See application file for complete search history.

(56) References Cited

U.S. PATENT DOCUMENTS

| | | | |
|---|---|---|---|
| 5,706,210 | A | 1/1998 | Kumano et al. |
| 5,799,200 | A | 8/1998 | Brant et al. |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Jude Jean Gilles (57) ABSTRACT

Locally providing cloud storage array services for a storage array of a data center when the storage array is not connected to a remote cloud-based storage array services provider includes initiating, by a primary storage array, one or more cloud storage array services and locally providing the cloud storage array services. Such local providing of the cloud storage array services also includes generating, by the cloud storage array services, metadata describing one or more real-time storage array characteristics and presenting the metadata to a user through a local area network.

17 Claims, 7 Drawing Sheets

Related U.S. Application Data continuation of application No. 14/721,571, filed on May 26, 2015, now Pat. No. 9,716,755.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,593,972 B2 * | 9/2009 | Silva-Craig ......... G06F 11/1464 |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B1 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,112,936 B1 | 8/2015 | Poletto et al. |
| 9,124,569 B2 | 9/2015 | Hussain et al. |
| 9,134,922 B2 | 9/2015 | Rajagopal et al. |
| 9,152,578 B1 | 10/2015 | Saad et al. |
| 9,189,334 B2 | 11/2015 | Bennett |
| 9,197,696 B1 | 11/2015 | Jakatdar et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,330,106 B2 | 5/2016 | Piasecki et al. |
| 9,444,822 B1 | 9/2016 | Borowiec et al. |
| 9,507,532 B1 | 11/2016 | Colgrove et al. |
| 9,521,200 B1 | 12/2016 | Borowiec et al. |
| 9,600,429 B2 * | 3/2017 | Pope ..................... G06F 13/385 |
| 9,626,127 B2 | 4/2017 | Glickman et al. |
| 9,632,870 B2 | 4/2017 | Bennett |
| 9,716,746 B2 | 7/2017 | Garg et al. |
| 9,716,755 B2 | 7/2017 | Borowiec et al. |
| 10,027,757 B1 * | 7/2018 | Borowiec ............ H04L 67/1097 |
| 10,154,112 B1 * | 12/2018 | Anthony ............. H04L 67/2852 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0199042 A1 | 8/2010 | Bates et al. |
| 2010/0211723 A1 | 8/2010 | Mukaida |
| 2010/0235422 A1 * | 9/2010 | Perret .................. H04L 43/0811 709/201 |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2011/0258461 A1 | 10/2011 | Bates |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0173822 A1 | 7/2012 | Testardi et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0117506 A1 | 5/2013 | Glickman et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0212262 A1 * | 8/2013 | Imes ....................... F24F 11/63 709/224 |
| 2013/0219164 A1 | 8/2013 | Hamid |
| 2013/0227201 A1 | 8/2013 | Talagala et al. |
| 2013/0262638 A1 | 10/2013 | Kumarasamy et al. |
| 2013/0262801 A1 | 10/2013 | Sancheti et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |

(56) References Cited

U.S. PATENT DOCUMENTS

| | | |
|---|---|---|
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0308098 A1 | 10/2014 | Lert et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0032817 A1 | 1/2015 | Garg et al. |
| 2015/0052392 A1 | 2/2015 | Mickens et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0244801 A1* | 8/2015 | Guo ............... H04L 67/2852 709/204 |
| 2015/0378888 A1 | 12/2015 | Zhang et al. |
| 2016/0098323 A1 | 4/2016 | Mutha et al. |
| 2016/0170823 A1 | 6/2016 | Miller et al. |
| 2016/0170833 A1* | 6/2016 | Segura ............ G06F 11/1088 714/6.23 |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | | |
|---|---|---|---|
| WO | WO-2013071087 A1 | 5/2013 | |
| WO | WO-2014/110137 A1 | 7/2014 | |
| WO | WO-2016/015008 A1 | 12/2016 | |
| WO | WO-2016/190938 A1 | 12/2016 | |
| WO | WO-2016/195759 A1 | 12/2016 | |
| WO | WO-2016/195958 A1 | 12/2016 | |
| WO | WO-2016/195961 A1 | 12/2016 | |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV- REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as The Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.
International Search Report and Written Opinion, PCT/US2016/015008, dated May 4, 2016, 12 pages.
International Search Report and Written Opinion, PCT/US2016/020410, dated Jul. 8, 2016, 12 pages.
International Search Report and Written Opinion, PCT/US2016/032084, dated Jul. 18, 2016, 12 pages.
International Search Report and Written Opinion, PCT/US2016/016333, dated Jun. 8, 2016, 12 pages.
International Search Report and Written Opinion, PCT/US2016/032052, dated Aug. 30, 2016, 17 pages.
International Search Report and Written Opinion, PCT/US2016/035492, dated Aug. 17, 2016, 10 pages.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.

* cited by examiner

FIG. 7

LOCALLY PROVIDING HIGHLY AVAILABLE CLOUD-BASED STORAGE SYSTEM SERVICES

CROSS-REFERENCE TO RELATED APPLICATIONS

This application is a continuation application of and claims priority from U.S. patent application Ser. No. 15/419,551, filed Jan. 30, 2017, which is a continuation application of and claims priority from U.S. Pat. No. 9,716,755, issued Jul. 25, 2017.

TECHNICAL FIELD

The field of technology is data processing, or, more specifically, methods, apparatus, and products for providing cloud storage array services for a storage array of a data center when the storage array is not connected to a remote cloud-based storage array services provider.

BACKGROUND ART

Data centers may include many computing components including servers, network devices, and storage arrays. As the need for storage of large amounts of data and efficient access to that data increases, storage array technology is advancing. Such storage arrays may provide persistent storage for any number of computing devices in a data center. Given that many data centers provide services to many different users, various considerations must be taken into account to provide efficient, useful, and secure access to and administration of storage arrays. Various management tools, reporting services, and the like may be implemented for storage array through cloud-based service providers. In some implementations, however, such cloud-based service providers may be unavailable, either by design or through a loss of connection.

SUMMARY

Methods, apparatus, and products for locally providing cloud storage array services for a storage array of a data center when the storage array is not connected to a remote cloud-based storage array services provider are disclosed in this specification. Providing such cloud storage array services in accordance with embodiments of the present invention includes: initiating, by a primary storage array, one or more cloud storage array services; and locally providing the cloud storage array services including: generating, by the cloud storage array services, metadata describing one or more real-time storage array characteristics; and presenting the metadata to a user through a local area network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

SUMMARY OF INVENTION

Exemplary methods, apparatus, and products for providing cloud storage array services for a storage array of a data center when the storage array is not connected to a remote cloud-based storage array services provider in accordance with the present invention are described with reference to the accompanying drawings, beginning with FIG. 1. The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

Figure 1:
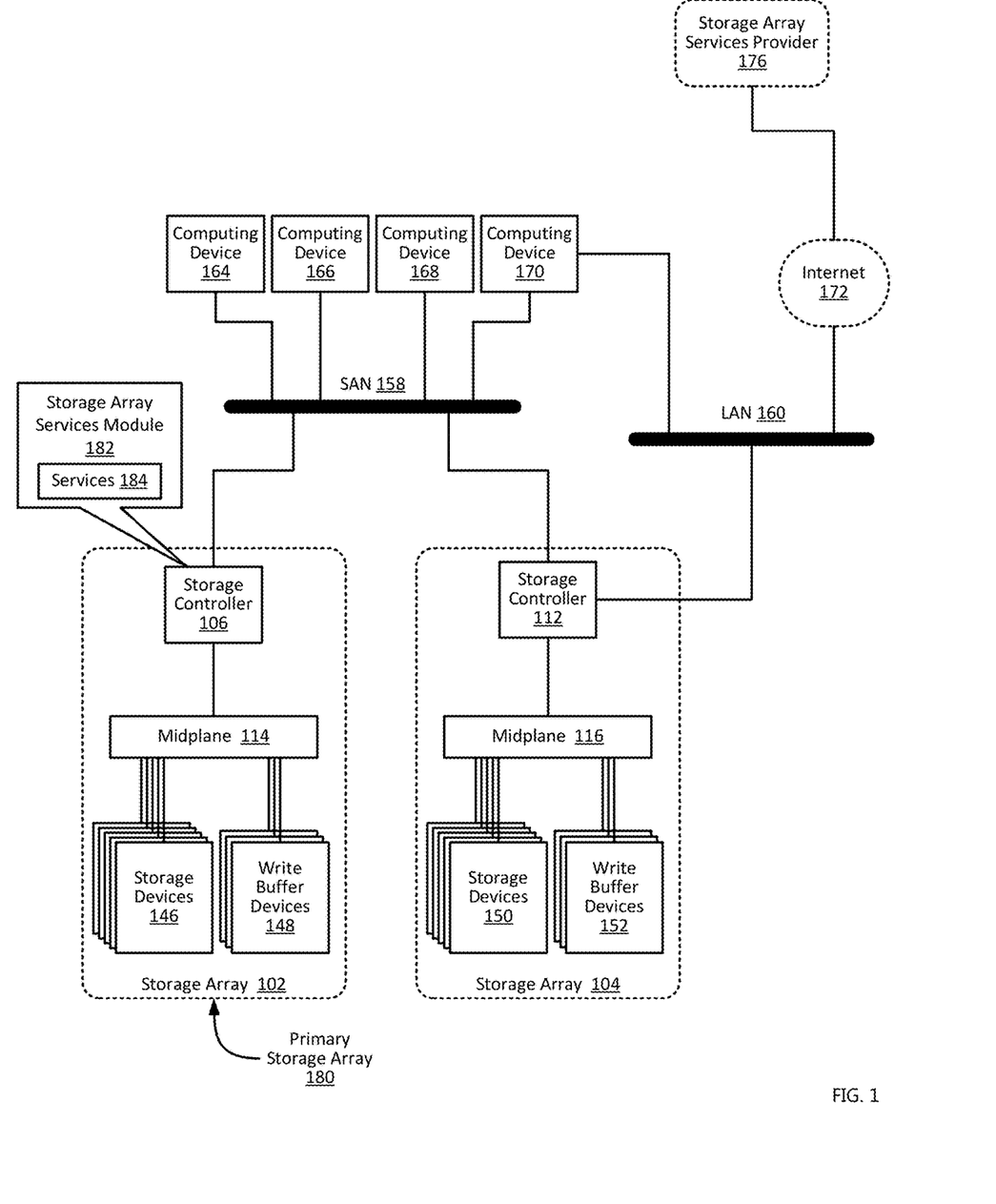
FIG. 1 sets forth a block diagram of a system configured for providing storage array services first in the cloud then locally according to embodiments of the present invention.

FIG. 1 sets forth a block diagram of a system configured for locally providing cloud storage array services according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164-170) in the example of FIG. 1 are coupled for data communications to a number of storage arrays (102, 104) through a storage area network (SAN) (158) as well as a local area network (160) (LAN). The SAN (158) may be implemented with a variety of data communications fabrics, devices, and protocols. Example fabrics for such a SAN may include Fibre Channel, Ethernet, Infiniband, SAS (Serial Attached Small Computer System Interface), and the like. Example data communications protocols for use in such a SAN (158) may include ATA (Advanced Technology Attachment), Fibre Channel Protocol, SCSI, iSCSI, HyperSCSI, and others. Readers of skill in the art will recognize that a SAN is just one among many possible data communications couplings which may be implemented between a computing device and a storage array. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include TCP (Transmission Control Protocol), UDP (User Datagram Protocol), IP (Internet Protocol), HTTP (HyperText Transfer Protocol), WAP (Wireless Access Protocol), HDTP (Handheld Device Transport Protocol), SIP (Session Initiation Protocol), RTP (Real Time Protocol) and others as will occur to those of skill in the art.

The example storage arrays (102, 104) of FIG. 1 provide persistent data storage for the computing devices. Each storage array (102, 104) includes a storage controller (106, 112). The storage controller is a module of automated computing machinery comprising computer hardware, computer software, or a combination of computer hardware and software. The storage controller may be configured to carry out various storage-related tasks. Such tasks may include writing data received from a computing device to storage, erasing data from storage, retrieving data from storage to provide to a computing device, monitoring and reporting of disk utilization and performance, performing RAID (Redundant Array of Independent Drives) or RAID-like data redundancy operations, compressing data, encrypting data, and so on.

Each storage controller (106, 112) may be implemented in a variety of ways, including as an FPGA (Field Programmable Gate Array), a PLC (Programmable Logic Chip), an ASIC (Application Specific Integrated Circuit), or computing device that includes discrete components such as a central processing unit, computer memory, and various adapters. Each storage controller (106, 112) may, for example, include a data communications adapter configured to support communications via the SAN (158) and the LAN (160). For clarity, only one of the storage controllers (112) in the example of FIG. 1 is depicted as coupled to the LAN (160) for data communications. Readers should understand that both storage controllers (106, 112) are independently coupled to the LAN (160). Each storage controller (106, 112) may also, for example, include an I/O controller or the like that couples the storage controller (106, 112) for data communications, through a midplane (114), to a number of storage devices (146, 150), and a number of write buffer (148, 152) devices.

Each write buffer device (148, 152) may be configured to receive, from the storage controller (106, 112), data to be stored in the storage devices (146). Such data may originate from any one of the computing devices (164-170). In the example of FIG. 1, writing data to the write buffer device may be carried out more quickly than writing data to the storage device. The storage controller (106, 112) may be configured to effectively utilize the write buffer devices (148, 152) as a quickly accessible redundant buffer for data destined to be written to storage. In this way, if the storage device to which the data is to be written fails or if the write does not complete, the write buffer device may maintain the data to be written during a retry of the write or during failover of the storage device to another location. That is, the write buffer device may provide redundancy for the storage devices.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ("Flash drives"), and the like.

In addition to being coupled to the computing devices through the SAN (158), the storage arrays may also be coupled to the computing devices through the LAN (160) and to one or more cloud service providers through the Internet (172). One example cloud service in FIG. 1 is a storage array services provider (176). The storage array service provider (176) may be configured to provide various storage array services (184) such as reporting of storage array performance characteristics, configuration control of the storage arrays, and the like. The storage array services provider may rely on modules executing on the storage array itself to gather or process such data.

In some instances, the storage arrays (102, 104) may be disconnected from the storage array services provider (176). Various reasons may exist for such a disconnect. For example, a loss of data communications connection between the storage array and the storage array services provider (176) may occur. In high-security data centers, as another example, the storage arrays (102, 104) may never be connected to the storage array services provider at all. In such situations, users may still desire the services provided by the storage array services provider. To that end, the system of FIG. 1 may be configured, according to embodiments of the present invention, to locally provide cloud storage array services for a storage array of a data center when the storage array is not connected to a remote cloud-based storage array services provider. Such local providing of the cloud storage array services may be carried out by a storage array services module (182) of one of the storage arrays (102, 104), referred to here as the 'primary' storage array (180). The storage array services module (182) is a module of automated computing machinery comprising computer hardware, computer software, or a combination of computer hardware and software. The storage array services module (182) may locally provide the cloud storage array services by, initiating one or more cloud storage array services (184) and locally providing the cloud storage array services. Providing the cloud storage array services locally may include generating, by the cloud storage array services (184), metadata describing one or more real-time storage array characteristics and presenting the metadata to a user through a local area network (160). 'Metadata' as the term is used in this specification refers to data that describes various characteristics of the storage array. Such data may take on various forms in dependence upon the types of cloud storage array services executing on the storage array. Some examples of such services may include a service that tracks and reports the rate and type of access of the storage devices of the storage array, a service that tracks and reports throughput of the storage array, a service that monitors and reports memory wear leveling of the storage devices, a service that reports capacity utilization of the storage devices, a service that reports deduplication statistics, a service that reports RAID (Redundant Array of Independent Drives) statistics, a service that reports logical volume statistics, a service that monitors and reports power consumption of the storage array, and other services as will occur to readers of skill in the art.

Prior to presentation, the metadata may be processed and analyzed. Such analysis processing and analysis may also be included in the presentation of the metadata to the user through the LAN (160). That is, 'presenting the metadata' is not limited to presenting the metadata in its original form. The metadata may be formatted, processed, analyzed, and otherwise altered for purposes of presentation.

As mentioned above, one example in which cloud storage array services are provided locally in accordance with embodiments of the present invention includes when a loss of data communications occurs. To that end, the primary storage array (180), through the storage array services module (182) may be configured to detect a data communications connection between the primary storage array (180) and a remote cloud-based storage array services provider (176). Here, a 'heartbeat' signal may be used to ensure that the data communications connection between the primary storage array (180) and the cloud-based storage array services provider (176) is maintained. Such a 'heartbeat' may be a periodic ping of the storage array services provider. As long as the ping is returned, the storage array services module (182) may infer that the data communications connection between the storage array services provider (176) and the primary storage array (180) has not been lost. In such an embodiment, the cloud-based storage array services provider (176) may provide the cloud storage array services remotely, rather than the storage array services module (182).

Further, while the data communications connection between the primary storage array (180) and the storage array services provider (176) is active, the storage array services module (182) may periodically retrieve, from the remote cloud-based storage array services provider (176), a current configuration of the cloud storage array services and a current configuration of the plurality of storage arrays (102, 104) in the data center. The term 'current configuration of the cloud storage array services' may include any data related to the execution of the services including, for example, a list of the types of services to be executed, the executable computer program instructions of the services themselves, updates to the executable computer program instructions of the services, data used to seed the services, data describing the format of presenting the results of the services, and so on. The term 'current configuration of the plurality of storage arrays' refers to any data describing each of the storage arrays of the data center including: storage capabilities of each storage array; data communications capabilities, endpoints, and present connectivity of each storage array; one or more identifiers of the storage array or the array's components; a listing of components of the storage array; an identification of logical volumes maintained by the storage array; and the like. By periodically updating these current configurations, the storage array services module (182) may be primed to locally provide the cloud storage array services upon a loss of data communications between the primary storage array (180) and the storage array services provider (176).

The storage array services module (182) may later detect loss of the data communications connection between the primary storage array and the remote cloud-based storage array services provider. The storage array services module (182) may detect such a loss of communications when a predefined number of pings of the heartbeat signal are not returned. Responsive to detecting the loss of communications between the primary storage array (180) and the storage array services provider (176), the storage array services provider may then initiate the cloud storage array services (184).

In embodiments in which multiple storage arrays are included in the data center, each storage array may be independently coupled for data communications to the cloud-based storage array services provider (176). In such embodiments, each storage array is generally unaware of the other storage arrays at least for purposes of participating in storage array services offered by the cloud-based storage array services provider (176). In such an embodiment, the cloud-based storage array services provider may expose a REST (Representational State Transition) API (Application Programming Interface), or the like, to the storage arrays to carry out data communications between a storage array service and a storage array. REST APIs generally utilize HTTP commands and a domain as the basis for data communications to between two endpoints. To that end, upon a loss of communications with the cloud-based storage array services provider (176), the primary storage array (180) may initiate the one or more cloud storage array services (184) by altering a local DNS (Domain Name Service) record such that the domain originally utilized by the cloud-based storage array services provider (176) redirects to an IP address of the primary storage array. In this way, any communications that would normally be addressed to the cloud-based storage array services provider from any storage array in the data center are now redirected to the primary storage array (180).

In such an embodiment in which multiple storage arrays are located within a single data center, generating metadata describing one or more real-time storage array characteristics may also include generating metadata describing one or more real-time storage array characteristics of each of the plurality of the storage arrays; and aggregating, for presentation to the user, the metadata of each of the plurality of storage arrays.

Although the example of FIG. 1 depicts the primary storage array (180) as the host of the cloud storage array services (184), other storage arrays may host the services in various circumstances. In this way, initiating the one or more cloud storage array services may also include selecting, by the primary storage array through the storage array services module (182) one of the plurality of storage arrays in the data center to host the one or more cloud storage array services in dependence upon workload characteristics of each of the plurality of storage arrays. The term 'workload characteristics' here refers to any metric that may be utilized to infer availability of processing capabilities. Examples of such workload characteristics may include processing capabilities of each storage array (CPU speed, memory bus speed, and the like), a history of storage access operations over a predefined period of time, status of a job queue directed to accessing a volume hosted on a storage array, and so on as will occur to readers of skill in the art. That is, a storage array with less workload than all other storage arrays may be utilized to host the cloud storage array services (184) so that primary data storage operations are unaffected.

In embodiments in which workload characteristics are utilized to select a host for the cloud-based storage array services, the primary storage array (180) may also be configured to detect a change in workload characteristics of each of the plurality of storage arrays. Such a change may be detected in a variety of ways including, for example, by detecting a failure of a storage array, by periodically retrieving workload characteristics, and so on. Upon detecting the change, the primary storage array (180) may then re-select one of the storage arrays to host the one or more cloud storage array services in dependence upon the changed workload characteristics. In this way, hosting of the services may be dynamically reassigned when workload changes amongst the storage arrays.

In embodiments in which a storage array other than the primary storage array (180) is selected to host the cloud-based storage array services, the primary storage array may operate as a proxy for the selected storage array. In such an embodiment, presenting the metadata to a user through a local area network may include presenting the metadata through the proxy of the primary storage array. The primary storage array (180) may operate as a proxy in different ways. In one way, the primary storage array receives only the final aggregated results for presentation to the user through the local area network (160). That is, the selected storage array actually hosting the cloud-based storage array services (184) may perform the services, collecting metadata from all storage arrays, aggregate the metadata into a single result and pass that result on to the primary storage array for presentation to a user. In another example, the selected storage array may execute the cloud-based storage array services and each storage array may pass its metadata directly to the primary storage array. In such an embodiment, the primary storage array may aggregate and process the metadata of each storage array prior to presenting the aggregated and processed metadata to a user through the LAN (160).

The arrangement of computing devices, storage arrays, cloud-based service providers, networks and other devices making up the exemplary system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Figure 2:
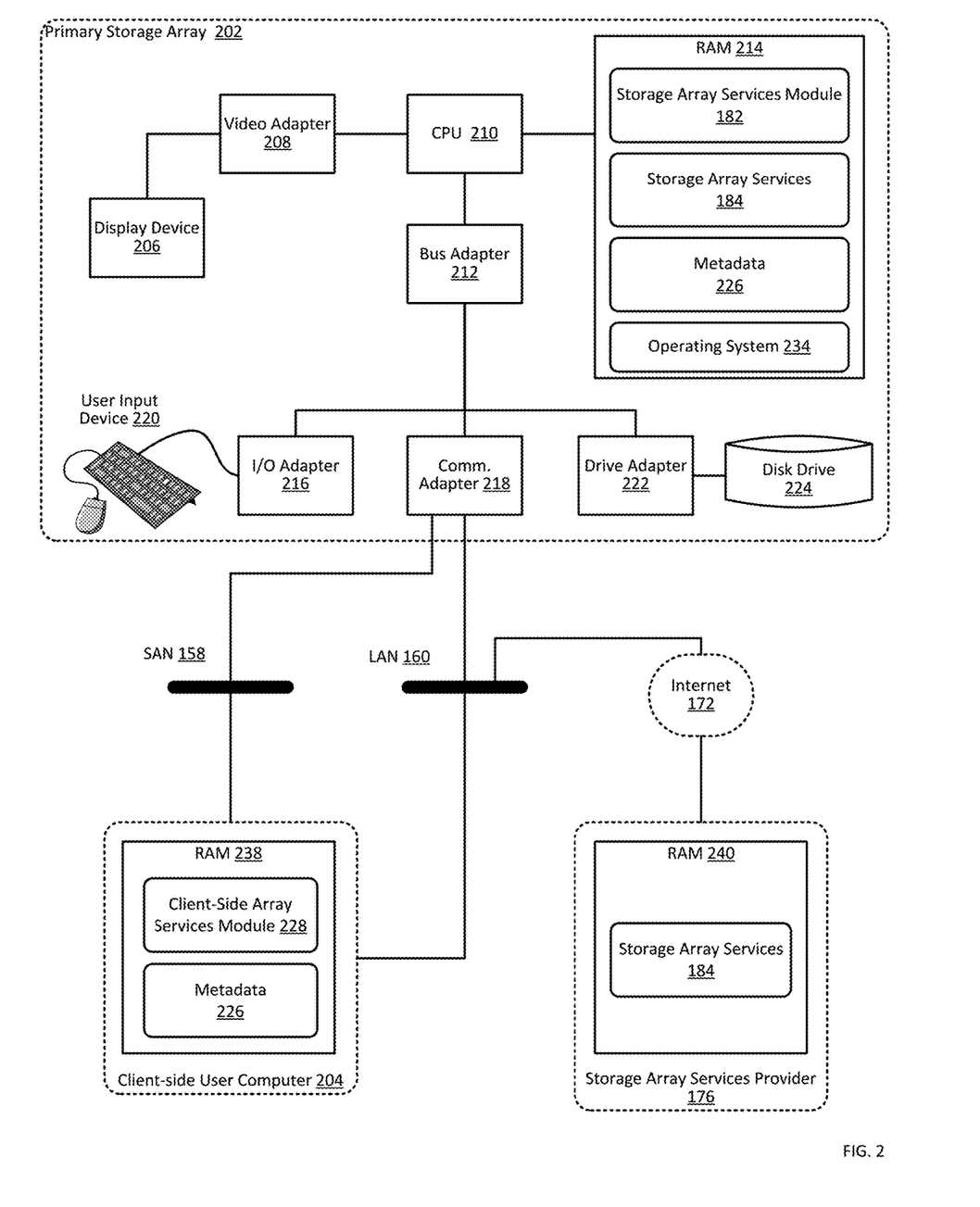
FIG. 2 sets forth a block diagram of several example computers useful for providing cloud storage array services according first in the cloud then locally according to embodiments of the present invention.

Locally providing cloud storage array services in accordance with embodiments of the present invention is generally implemented with computers. In the system of FIG. 1, for example, all the computing devices (164-170), storage arrays (102, 104), and storage array services provider (176) may be implemented to some extent at least as computers. For further explanation, therefore, FIG. 2 sets forth a block diagram several example computers useful for locally providing cloud storage array services according to embodiments of the present invention. The example computers in FIG. 2 include a primary storage array (202), a client-side computer (204), and a storage array services provider (176). For clarity, only one computer, the primary storage array (202), in the example of FIG. 2 is depicted with a number of various computing components which are described below in greater detail. Readers will understand that the client-side user computer (204) and storage array services provider (176) may include similar components that operate in a similar manner.

The primary storage array (202) of FIG. 2 includes at least one computer processor (210) or 'CPU' as well as random access memory (214) ('RAM') which is connected through a high speed memory bus and bus adapter (212) to processor (210) and to other components of the primary storage array (202). Stored in RAM (214) is a storage array services module (182), a module of computer program instructions that, when executed, causes the primary storage array (202) of FIG. 2 to locally provide cloud storage array services when the storage array (202) is not connected to a remote cloud-based storage array services provider (172) by initiating one or more cloud storage array services (184) and locally providing the cloud storage array services including: generating, by the cloud storage array services, metadata (226) describing one or more real-time storage array characteristics; and presenting the metadata to a user through a local area network.

Here, the user may receive or view the metadata (226) through a client-side array services module (228) stored in RAM (238) of a client-side user computer (204). In the example of FIG. 2, the client-side user computer (204) is depicted as being coupled through the SAN (158) to the storage array (202) for use in storing data in the storage array. Alternatively, the client-side user computer (204) may be a device that is not connected to the storage array (202) for purposes of storing data but rather may be connected only via a LAN for purposes of receiving results of the cloud storage array services. Consider, for example, a client-side user computer that is implemented as a mobile device that is carried by a system administrator. Although the mobile device is not coupled to the storage array for purposes of data storage, the system administrator may utilize the mobile device to request and receive results from various reporting services that indicate storage array performance characteristics, errors, alerts, and the like.

In some embodiments, prior to the storage array services module (182) initiating cloud storage array services (184) locally, such cloud storage array services may be provided remotely via the storage array services provider (176). In such an embodiment, the cloud storage array services (184) may be stored in RAM (24) of the storage array services provider (176) and be accessible via an API exposed by the storage array services provider via data communications over the Internet (172) or some other wide-area network.

Turning back to the components of the primary storage array (202), also stored in RAM (214) is an operating system (234). Examples of operating systems useful in primary storage arrays configured for locally providing cloud storage array services according to embodiments of the present invention include UNIX™, Linux™, Microsoft Windows™, and others as will occur to those of skill in the art. The operating system (234), the storage array services module (182), the cloud storage array services (184) and the metadata (226) in the example of FIG. 2 are shown in RAM (168), but many components of such software typically are stored in non-volatile memory also, such as, for example, on a disk drive (224). Likewise, the modules depicted in RAM (238, 240) of the client-side user computer (204) and the storage array services provider (176) may be stored in non-volatile memory.

The primary storage array (202) of FIG. 2 also includes disk drive adapter (222) coupled through an expansion bus and bus adapter (212) to the processor (210) and other components of the primary storage array (202). Disk drive adapter (222) connects non-volatile data storage to the primary storage array (202) in the form of disk drive (224). Disk drive adapters may be implemented in a variety of ways including as SATA (Serial Advanced Technology Attachment) adapters, PATA (Parallel ATA) adapters, Integrated Drive Electronics ('IDE') adapters, Small Computer System Interface (SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example primary storage array (202) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example primary storage array (202) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The exemplary primary storage array (202) of FIG. 2 includes a communications adapter (218) for data communications with other computers (204, 176) through the Internet (172). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

The example of FIG. 2 depicts a storage array implemented as one type of example computer. Readers of skill in the art will immediately recognize, however, that such a storage array useful for locally providing cloud storage array services in accordance with embodiments of the present invention may be implemented in a variety of different ways and include a variety of different components. To that end and for further explanation, FIG. 3 sets forth a block diagram of an example storage controller (106) of a primary storage array (202) configured for locally providing cloud storage array services in accordance with embodiments of the present invention. The example storage controller includes a computer processor (314). The computer processor is coupled to RAM (214) through a DDR4 (Double-Data Rate 4) bus. Stored in RAM (214) is a storage array services module (182) that operates as described above to locally provide one or more cloud storage array services (184) including the generation and presentation, to a user, of metadata (226) describing real-time storage array characteristics.

Figure 3:
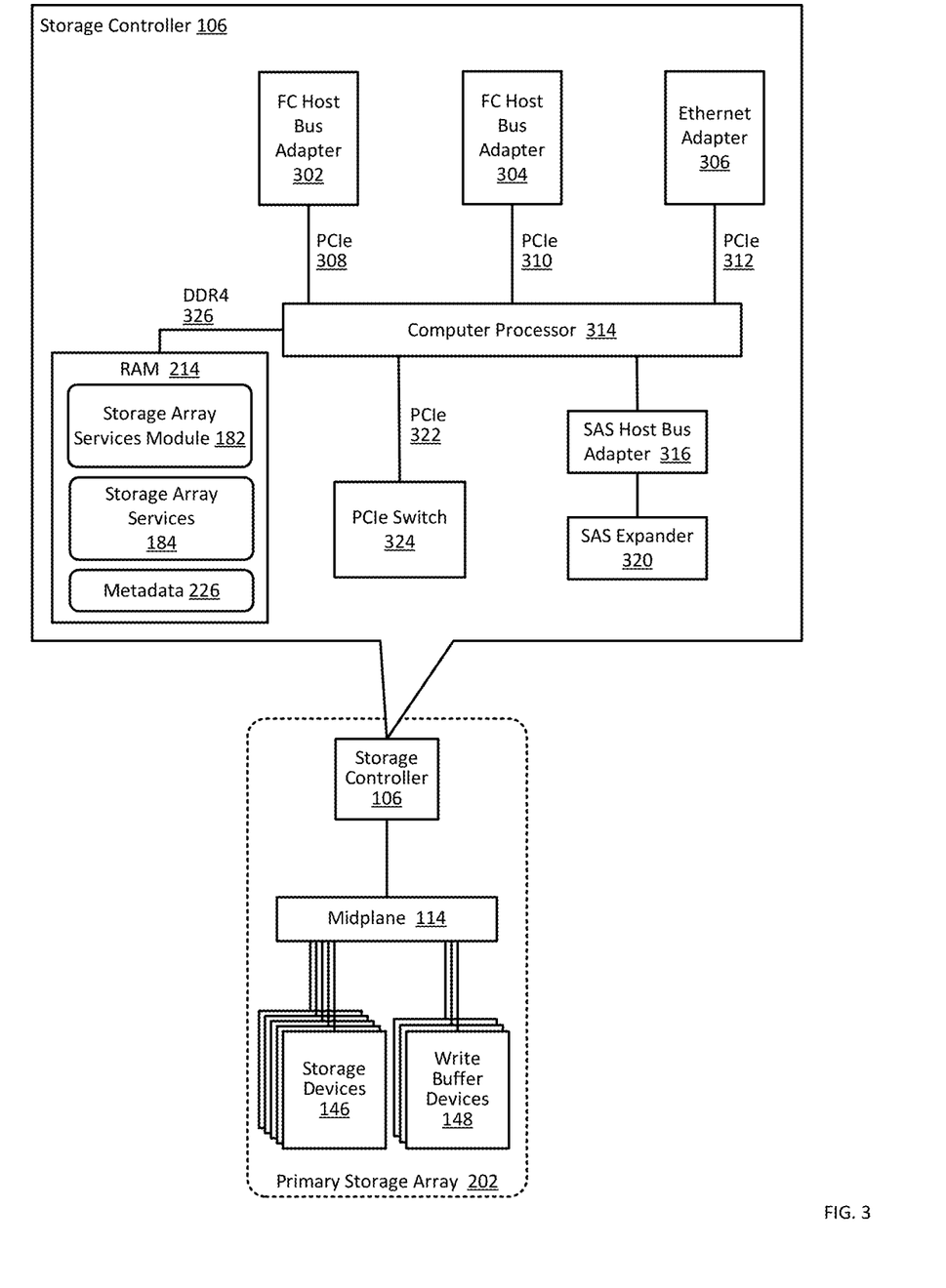
FIG. 3 sets forth a block diagram of an example storage controller of a storage array useful for locally providing cloud storage array services.

The processor (314) is also coupled for data communications through PCIe (Peripheral Component Interface express) links (308, 310, 312, 322) to several Fibre Channel host bus adapters (302, 304), an Ethernet adapter (306), and a PCIe switch (324). The Fibre Channel host bus adapters (308, 310) may couple the storage controller to a storage area network, such the SAN (158) depicted in the example of FIGS. 1 and 2. The Ethernet adapter (306) may couple the storage controller to a local area network such as the LAN (160) depicted in the example of FIGS. 1 and 2. The PCIe switch (324) may provide data communications across other PCI links through the midplane to PCI endpoints, such as storage devices or write buffer devices. Likewise, the processor (314) is also coupled through a SAS (Serial Attached SCSI) host bus adapter (316) to a SAS expander (320). The SAS expander may provide SAS connections between the computer processor (314) and other devices through the midplane.

Readers of skill in the art will recognize that these components, protocols, adapters, and architectures are for illustration only, not limitation. Such a storage controller may be implemented in a variety of different ways. Each such way is well within the scope of the present invention.

Figure 5:
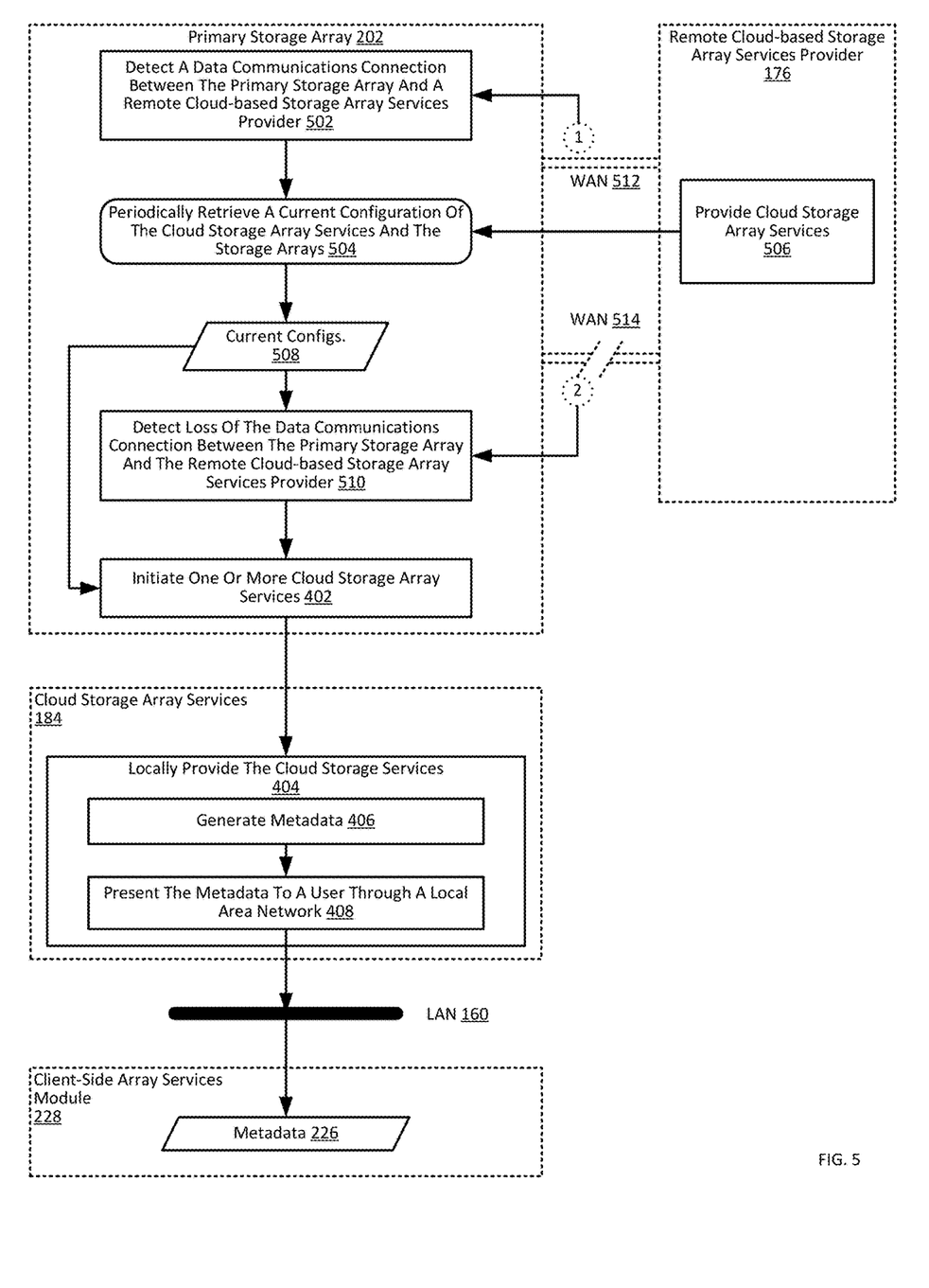
FIG. 5 sets forth a flow chart illustrating an exemplary method of locally providing cloud storage array services according to embodiments of the present invention FIG. 6 sets forth a flow chart illustrating another method of locally providing cloud storage array services in accordance with embodiments of the present invention.

For further explanation, FIG. 5 sets forth a flow chart illustrating an exemplary method for locally providing cloud storage array services according to embodiments of the present invention. The method of FIG. 5 includes initiating (402), by a primary storage array (202), one or more cloud storage array services (184). Initiating (402) one or more cloud storage array services (184) may include deploying and executing one or more modules of computer program instructions.

The method of FIG. 5 also includes locally providing (404) the cloud storage array services (184). In the method of FIG. 5, locally providing (404) the cloud storage array services (184) is carried out by generating (406), by the cloud storage array services (184), metadata (226) describing one or more real-time storage array characteristics; and presenting (408) the metadata to a user through a local area network. Generating (406) such metadata may be carried out in various ways depending upon the type of service performed. In embodiments in which a service reports throughput of a storage array, the service may monitor a number of data storage write operations completed over a predefined period time. Such a number is metadata describing real-time storage array characteristic.

Presenting (408) metadata (226) locally to a user may be carried out by sending the data through the local area network (160) to a client-side array services module for presentation in a GUI (Graphical User Interface) (410). A client-side array services module (228) is a module of automated computing machinery comprising computer hardware, computer software, or a combination of computer hardware and software that is configured to receive and present in a GUI metadata from cloud storage array services. One example of a client-side array services module (228) may be a web browser and the GUI (410) may be a webpage hosted by the primary storage array (202). In another example, the client-side array services module (228) may be implemented as an application for a mobile device. These are but a few of many possible implementations of a client-side array services module (228) that may be configured to receive and present metadata to a user.

Figure 4:
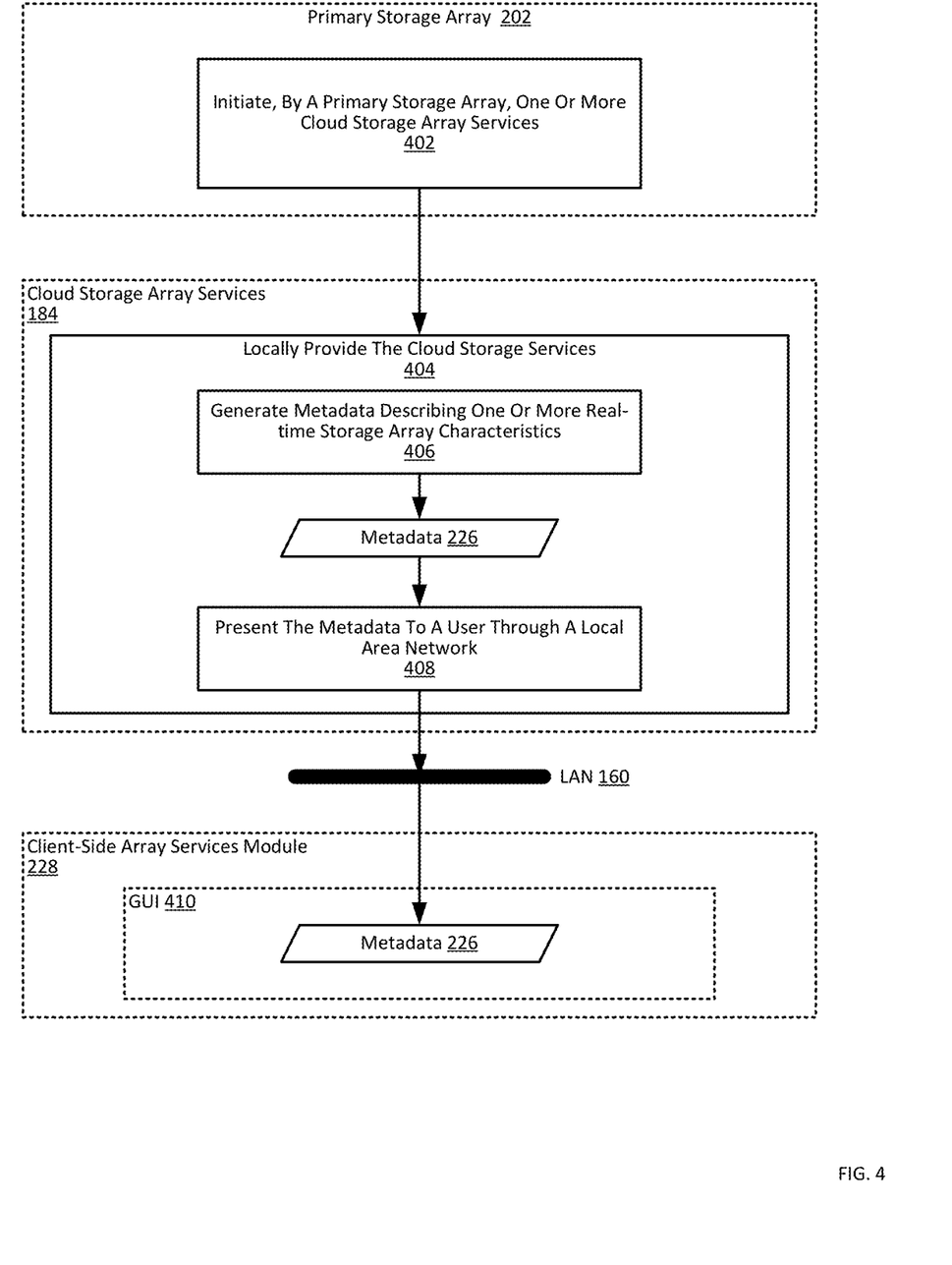
FIG. 4 sets forth an example block diagram of a system that locally provides cloud storage array services in accordance with embodiments of the present invention.

For further explanation, FIG. 5 sets forth a flow chart illustrating another method of locally providing cloud storage array services in accordance with embodiments of the present invention. The method of FIG. 5 is similar to the method of FIG. 4 including, as it does: initiating (402) one or more cloud storage array services (184) and locally providing (404) the cloud storage array services including: generating (406) metadata; and presenting (408) the metadata to a user through a local area network (160).

The method of FIG. 5 differs from the method of FIG. 5, however, in that the method of FIG. 5 also includes detecting (502), by the primary storage array (202) prior to initiating (402) the cloud storage array services (184), a data communications connection (512) between the primary storage array (202) and a remote cloud-based storage array services provider (176). Detecting (502) a data communications connection (512) between the primary storage array (202) and the remote cloud-based storage array services provider (176) may be carried out in a variety of manners. In one example, the primary storage array (202) may periodically ping the cloud-based storage array services provider (176). Each ping is returned by the cloud-based storage array services provider as long as a data communications connection over the wide area network (WAN) (512) is active.

While the data communications connection is active, the method of FIG. 5 includes providing (506), by the remote cloud-based storage array services provider (176), the cloud storage array services. The cloud-based storage array services provider (176) may provide many different types of cloud storage array services (184) in many different ways. In one example, the cloud-based storage array services provider (176) may expose an API to the primary storage array (and other storage arrays) where the API enables the performance of the cloud storage array services.

Also while the data communications connection between the primary storage array (202) and the remote cloud based storage array services provider (176) is active, the method of FIG. 5 may optionally include periodically retrieving (504), by the primary storage array from the remote cloud-based storage array services provider, a current configuration (508) of the cloud storage array services and a current configuration (508) of the plurality of storage arrays. The configuration of cloud storage array services may be updated over time by developers of the cloud storage array services and the configuration of the storage arrays in the data center may updated by system administrators of the storage arrays or data center.

The method of FIG. 5 also includes detecting (508), by the primary storage array (202), loss of the data communications connection (514) between the primary storage array (202) and the remote cloud-based storage array services provider (176). Continuing with the heartbeat example described above, upon a predefined number of un-returned pings, the primary storage array (202) may infer a loss of data communications connection between the primary storage array (202) and the cloud-based storage area service provider (176). In an embodiment in which the data communication connection was previously active then is lost, the primary storage array (202) may be configured to initiate (402) the one or more cloud storage array services by the primary storage array only in response to detecting the loss of the data communications connection between the primary storage array and the remote, cloud-based storage array services provider.

Figure 6:
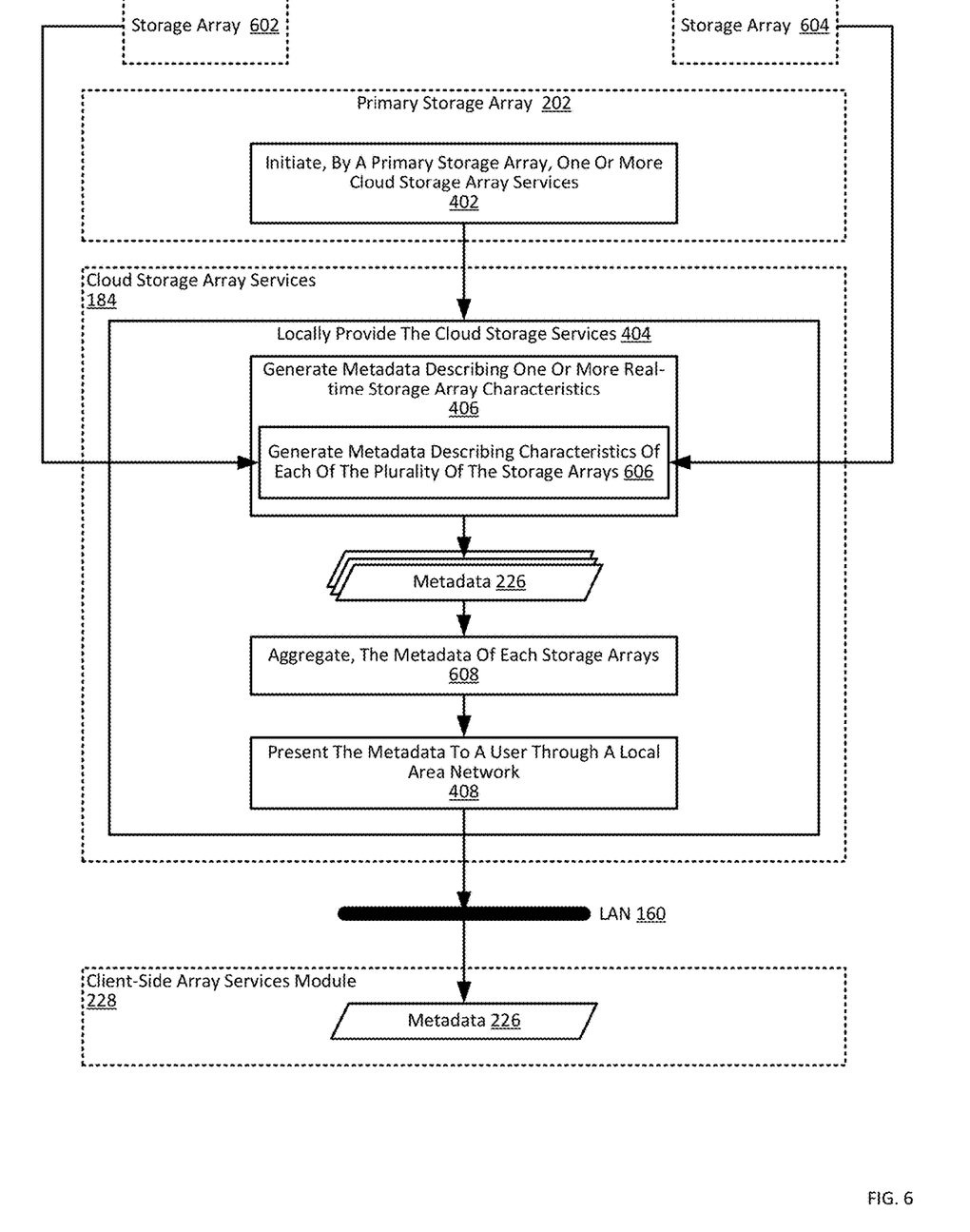

For further explanation, FIG. 6 sets forth a flow chart illustrating another method of locally providing cloud storage array services in accordance with embodiments of the present invention. The method of FIG. 6 is similar to the method of FIG. 4 including, as it does: initiating (402) one or more cloud storage array services (184) and locally providing (404) the cloud storage array services including: generating (406) metadata; and presenting (408) the metadata to a user through a local area network (160).

The method of FIG. 6 differs from the method of FIG. 5, however, in that in the method of FIG. 6, the data center includes a plurality of storage arrays (602, 604), including the primary storage array (202). Also in the method of FIG. 5 generating (406) metadata (226) describing one or more real-time storage array characteristics includes: generating (606) metadata describing one or more real-time storage array characteristics of each of the plurality of the storage arrays (602, 604, 402) and aggregating (608), for presentation to the user, the metadata (226) of each of the plurality of storage arrays. In this way, cloud storage array services may be performed for a plurality of storage arrays in a single data center and all results are aggregated for presentation of a user.

Figure 7:
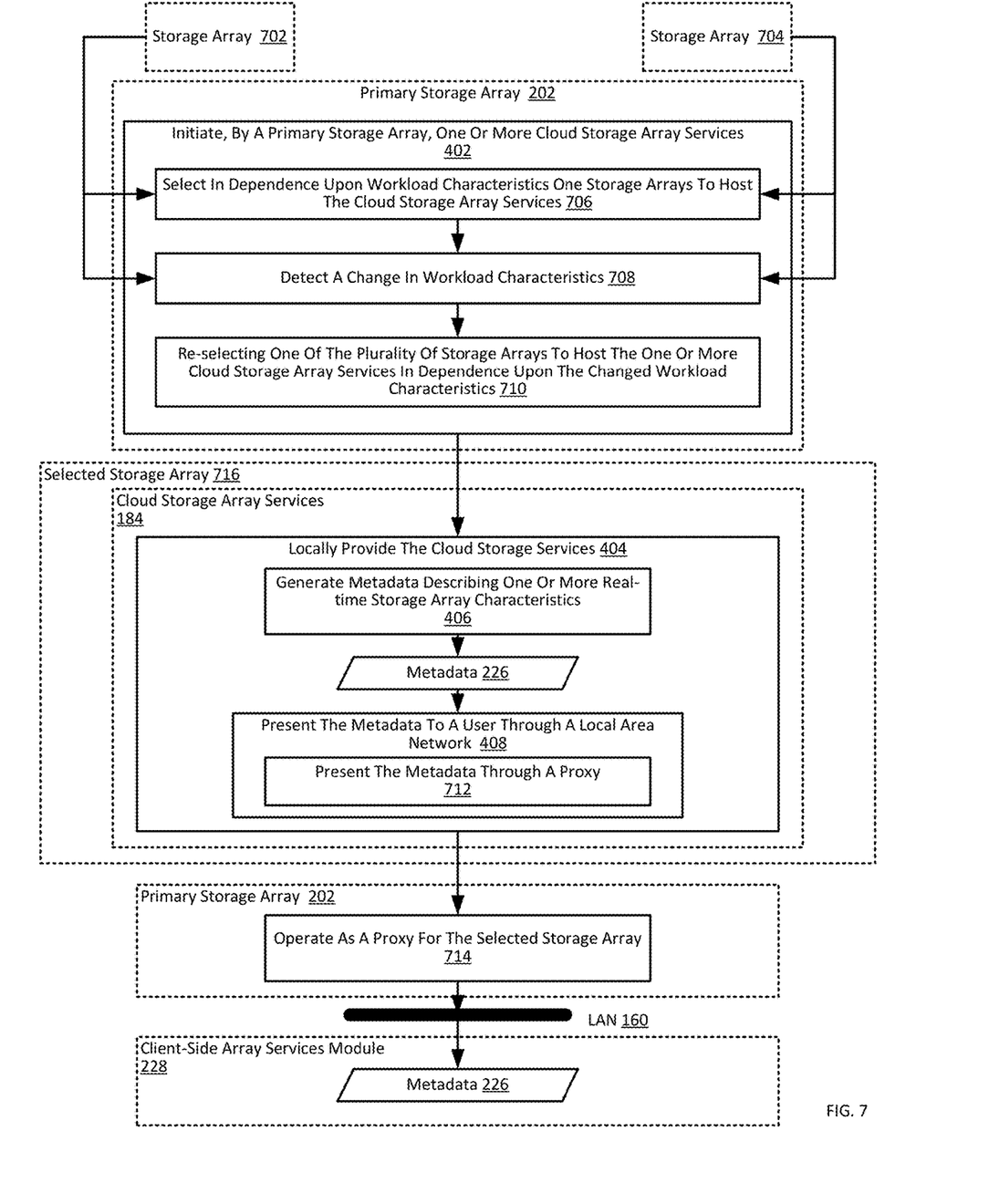
FIG. 7 sets forth a flow chart illustrating another method of locally providing cloud storage array services in accordance with embodiments of the present invention.

For further explanation, FIG. 7 sets forth a flow chart illustrating another method of locally providing cloud storage array services in accordance with embodiments of the present invention. The method of FIG. 7 is similar to the method of FIG. 4 including, as it does: initiating (402) one or more cloud storage array services (184) and locally providing (404) the cloud storage array services including: generating (406) metadata; and presenting (408) the metadata to a user through a local area network (160).

The method of FIG. 6 differs from the method of FIG. 5, however, in that in the method of FIG. 6, the data center includes a plurality of storage arrays (702, 704), including the primary storage array (202). The method of FIG. 7 differs from the method of FIG. 5 in that in the method of FIG. 7 initiating (402), by the primary storage array, one or more cloud storage array services (402) includes selecting (706), by the primary storage array (202) in dependence upon workload characteristics of each of the plurality of storage arrays (702, 704), one of the plurality of storage arrays to host the one or more cloud storage array services (184). Selecting a storage array to host the cloud storage array services in dependence upon workload characteristics may include retrieving from each of the storage arrays one or more metrics useful for inferring availability of processing capabilities and selecting the storage array with the greatest inferred availability of processing capabilities.

The method of FIG. 7 also includes detecting (708), by the primary storage array (202), a change in workload characteristics of each of the plurality of storage arrays and re-selecting (710) one of the plurality of storage arrays to host the one or more cloud storage array services in dependence upon the changed workload characteristics. The primary storage array (202) may be configured to periodically request workload characteristics from each of the plurality of storage arrays and determine if a change in the workload characteristics necessitates a change in selection of the storage array hosting the cloud storage array services (184).

The method of FIG. 7 also includes operating (714), by the primary storage array (202), as a proxy for the selected storage array (716) when the selected storage array (716) is not the primary storage array (202). Operating (714) as a proxy may take various forms. As mentioned above, the primary storage array (202) may operate as a proxy by receiving a final aggregated result of the performance of the cloud storage array services or may operate as a proxy by receiving, from each storage array independently, metadata streams generated as a result of the execution of the cloud storage array services by the selected storage array (716). In the latter example, the primary storage array (202) may process, analyze, and aggregated the various independent streams of metadata. To that end, presenting (408) the metadata to a user through a local area network in the method of FIG. 7 is carried out by presenting (712) the metadata through the proxy of the primary storage array (714).

Exemplary embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of locally providing highly available cloud-based storage system services, the method comprising:

initiating one or more cloud storage system services;
detecting a loss of data communications with the remote storage system; and
initiating the one or more cloud storage system services locally, including selecting, in dependence upon workload characteristics of each of a plurality of additional storage systems, one of the additional storage systems to host the one or more cloud storage array services.

2. The method of claim 1 further comprising detecting, prior to initiating the cloud storage array services, a data communications connection with the remote storage system.

3. The method of claim 1 further comprising periodically retrieving, from the remote storage system, a current configuration of the cloud storage array services.

4. The method of claim 1 further comprising, prior to detecting the loss of the data communications connection with the remote storage system, periodically retrieving a current configuration of a plurality of additional storage systems.

5. The method of claim 1 further comprising:
detecting a change in workload characteristics of at least one of the additional storage systems; and
re-selecting one of the additional storage systems to host the one or more cloud storage array services in dependence upon the changed workload characteristics.

6. The method of claim 1 further comprising:
operating as a proxy for the selected storage system when the selected storage system is not a primary storage system; and
presenting the metadata to a user through a local area network including presenting the metadata through the proxy of the primary storage system.

7. A storage system that includes a plurality of storage devices, the storage system including a computer processor and a computer memory, the computer memory including computer program instructions that, when executed by the computer processor, cause the storage system to carry out the steps of:
initiating one or more cloud storage system services;
detecting a loss of data communications with the remote storage system; and
initiating the one or more cloud storage system services locally, including selecting, in dependence upon workload characteristics of each of a plurality of additional storage systems, one of the additional storage systems to host the one or more cloud storage array services.

8. The storage system of claim 7 further comprising computer program instructions that, when executed by the computer processor, cause the storage system to carry out the step of detecting, prior to initiating the cloud storage array services, a data communications connection with the remote storage system.

9. The storage system of claim 7 further comprising computer program instructions that, when executed by the computer processor, cause the storage system to carry out the step of periodically retrieving, from the remote storage system, a current configuration of the cloud storage array services.

10. The storage system of claim 7 further comprising computer program instructions that, when executed by the computer processor, cause the storage system to carry out the step of, prior to detecting the loss of the data communications connection with the remote storage system, periodically retrieving a current configuration of a plurality of additional storage systems.

11. The storage system of claim 7 further comprising computer program instructions that, when executed by the computer processor, cause the storage system to carry out the steps of:
detecting a change in workload characteristics of at least one of the additional storage systems; and
re-selecting one of the additional storage systems to host the one or more cloud storage array services in dependence upon the changed workload characteristics.

12. The storage system of claim 7 further comprising computer program instructions that, when executed by the computer processor, cause the storage system to carry out the steps of:
operating as a proxy for the selected storage system when the selected storage system is not a primary storage system; and
presenting the metadata to a user through a local area network including presenting the metadata through the proxy of the primary storage system.

13. An apparatus for use in a storage system that includes a plurality of storage devices, the apparatus including a computer processor and a computer memory, the computer memory including computer program instructions that, when executed by the computer processor, cause the storage system to carry out the steps of:
initiating one or more cloud storage system services;
detecting a loss of data communications with the remote storage system; and
initiating the one or more cloud storage system services locally, including selecting, in dependence upon workload characteristics of each of a plurality of additional storage systems, one of the additional storage systems to host the one or more cloud storage array services.

14. The apparatus of claim 13 further comprising computer program instructions that, when executed by the computer processor, cause the storage system to carry out the step of detecting, prior to initiating the cloud storage array services, a data communications connection with the remote storage system.

15. The apparatus of claim 13 further comprising computer program instructions that, when executed by the computer processor, cause the storage system to carry out the step of periodically retrieving, from the remote storage system, a current configuration of the cloud storage array services.

16. The apparatus of claim 13 further comprising computer program instructions that, when executed by the computer processor, cause the storage system to carry out the step of, prior to detecting the loss of the data communications connection with the remote storage system, periodically retrieving a current configuration of a plurality of additional storage systems.

17. The apparatus of claim 13 further comprising computer program instructions that, when executed by the computer processor, cause the storage system to carry out the steps of:
detecting a change in workload characteristics of at least one of the additional storage systems; and
re-selecting one of the additional storage systems to host the one or more cloud storage array services in dependence upon the changed workload characteristics.

* * * * *